United States Patent
Tan et al.

(10) Patent No.: US 12,172,309 B2
(45) Date of Patent: Dec. 24, 2024

(54) SYSTEMS AND METHODS FOR LEARNING AGILE LOCOMOTION FOR MULTIPED ROBOTS

(71) Applicant: Google LLC, Mountain View, CA (US)

(72) Inventors: Jie Tan, Mountain View, CA (US);
Tingnan Zhang, San Jose, CA (US);
Atil Iscen, Mountain View, CA (US);
Erwin Coumans, Foster City, CA (US);
Yunfei Bai, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 650 days.

(21) Appl. No.: 17/047,892

(22) PCT Filed: Apr. 22, 2019

(86) PCT No.: PCT/US2019/028454
§ 371 (c)(1),
(2) Date: Oct. 15, 2020

(87) PCT Pub. No.: WO2019/209681
PCT Pub. Date: Oct. 31, 2019

(65) Prior Publication Data
US 2021/0162589 A1 Jun. 3, 2021

Related U.S. Application Data

(60) Provisional application No. 62/661,055, filed on Apr. 22, 2018.

(51) Int. Cl.
*B62D 57/032* (2006.01)
*B25J 9/16* (2006.01)
(Continued)

(52) U.S. Cl.
CPC ............. *B25J 9/161* (2013.01); *B25J 9/1605* (2013.01); *B25J 9/163* (2013.01); *B25J 9/1664* (2013.01);
(Continued)

(58) Field of Classification Search
None
See application file for complete search history.

(56) References Cited

U.S. PATENT DOCUMENTS 9,557,722 B1 * 1/2017 Hoffmann ............ G05B 13/024
10,550,860 B2 * 2/2020 Perkins .................. F15B 15/28
(Continued)

FOREIGN PATENT DOCUMENTS

CN 105538325 5/2016
WO 2017189859 11/2017

OTHER PUBLICATIONS

Tzuu-Hseng, Walking Motion Generation, Synthesis, and Control for Biped Robot by Using PGRL, LPI, and Fuzzy Logic, Jun. 2011, IEEE Transactions on Systems, Man, and Cybernetics—Part B: Cybernetics, vol. 41, No. 3, Jun. 2011 (Year: 2011).*

(Continued)

*Primary Examiner* — Jaime Figueroa
*Assistant Examiner* — Arslan Azhar
(74) *Attorney, Agent, or Firm* — Gray Ice Higdon

(57) ABSTRACT

Training and/or using a machine learning model for locomotion control of a robot, where the model is decoupled. In many implementations, the model is decoupled into an open loop component and a feedback component, where a user can provide a desired reference trajectory (e.g., a symmetric sine curve) as input for the open loop component. In additional and/or alternative implementations, the model is decoupled into a pattern generator component and a feedback component, where a user can provide controlled (Continued)

parameter(s) as input for the pattern generator component to generate pattern generator phase data (e.g., an asymmetric sine curve). The neural network model can be used to generate robot control parameters.

18 Claims, 8 Drawing Sheets

(51) Int. Cl.
    *G05D 1/00*         (2024.01)
    *G06N 3/042*      (2023.01)
    *G06N 3/08*       (2023.01)

(52) U.S. Cl.
    CPC .......... *B25J 9/1669* (2013.01); *B62D 57/032* (2013.01); *G05D 1/0891* (2013.01); *G06N 3/042* (2023.01); *G06N 3/08* (2013.01)

(56) References Cited

U.S. PATENT DOCUMENTS

| | | | | |
|---|---|---|---|---|
| 2008/0281469 | A1* | 11/2008 | Choi | B62D 57/032 700/253 |
| 2009/0187275 | A1* | 7/2009 | Suga | B62D 57/032 901/1 |
| 2011/0231050 | A1* | 9/2011 | Goulding | G05D 1/0891 180/8.1 |
| 2015/0127155 | A1 | 5/2015 | Passot et al. | |
| 2021/0073096 | A1* | 3/2021 | Kato | B25J 9/1676 |

OTHER PUBLICATIONS

Katic, D. et al., "Hybrid Dynamic Control Algorithm for Humanoid Robots Based on Reinforcement Learning"; Journal of Intelligent and Robotic Systems; Theory and Applications—(Incorporating Mechatronic Systems Engineering); Kluwer Academic Publishers, DO, vol. 51, No. 1; pp. 3-30; dated Sep. 25, 2007.
Arao, M. et al., "Flexible Intelligent System based on Fuzzy, Neural Networks and Reinforcement Learning"; International Joint Conference of the Fourth IEEE International Conference on Fuzzy Systems and the Second International Fuzzy Engineering Symposium; vol. 5; pp. 69-70; dated Mar. 20, 1995.
European Patent Office; International Search Report and Written Opinion of PCT Ser. No. PCT/US2019/028454; 16 pages; dated Sep. 13, 2019.
Benbrahim, H. et al., "Biped Dynamic Walking Using Reinforcement Learning;" Robotics and Autonomous Systems Journal, 20 pages; 1997.
Boeing, A. et al., "Leveraging Multiple Simulators For Crossing The Reality Gap;" 12th International Conference on Control Automation Robotics & Vision (ICARCV), IEEE, pp. 1113-1119, 2012.
Bousmalis, K. et al., "Using Simulation And Domain Adaptation To Improve Efficiency Of Deep Robotic Grasping;" Cornell University, arXiv.org, arXiv:1709.07857v2; 9 pages; Sep. 25, 2017.
Choromanski, K. et al., "Optimizing Simulations With Noise-Tolerant Structured Exploration"; 2018 IEEE International Conference on Robotics and Automation (ICRA), 9 pages; 2018.
De, Avik, "Modular Hopping and Running Via Parallel Composition;" University of Pennsylvania, Scholarly Commons, Departmental Papers (ESE); 190 pages; Nov. 3, 2017.
De, A. et al., "The Penn Jerboa: A Platform For Exploring Parallel Composition Of Templates;" Cornell University, arXiv.org, arXiv:1502.05347v1; 24 pages; Feb. 18, 2015.
Duan, Y. et al., "Benchmarking Deep Reinforcement Learning For Continuous Control;" Proceedings of the 33rd International Conference on Machine Learning, vol. 48, ICML, 10 pages; 2016.
Endo, G. et al., "Learning CPG Sensory Feedback With Policy Gradient For Biped Locomotion For A Full-Body Humanoid;" Proceedings of the 20th National Conference on Artificial Intelligence, vol. 3, pp. 1267-1273; Jul. 2005.
Fang, K. et al., "Multi-Task Domain Adaptation For Deep Learning Of Instance Grasping From Simulation;" Cornell University, arXiv.org, arXiv:1710.06422v1; 9 pages; Oct. 17, 2017.
Gay, S. et al., "Learning Robot Gait Stability Using Neural Networks As Sensory Feedback Function For Central Pattern Generators;" IEEE/RSJ International Conference on Intelligent Robots and Systems (IROS), 8 pages, Nov. 2013.
Ha, S. et al., "Reducing Hardware Experiments For Model Learning And Policy Optimization;" IEEE International Conference on Robotics and Automation (ICRA), 7 pages, 2015.
Hafner, D. et al., "TensorFlow Agents: Efficient Batched Reinforcement Learning In TensorFlow;" Cornell University, arXiv.org, arXiv:1709.02878v1; 8 pages; Sep. 8, 2017.
Hanna, J. et al., "Grounded Action Transformation For Robot Learning In Simulation;" Proceedings of the 31st AAAI Conference on Artificial Intelligence (AAAI); 7 pages, Feb. 2017.
Heess, N. et al., "Emergence Of Locomotion Behaviours In Rich Environments;" Cornell University, arXiv.org, arXiv:1707.02286v2; 14 pages; Jul. 10, 2017.
Hirai, I. et al., "Slipperiness And Coefficient Of Friction On The Carpets;" Based on the Textile Machinery Society of Japan, vol. 53, No. 6,T140-T146; 6 pages; 2000.
Jakobi, N. et al., "Noise and the Reality Gap: The Use of Simulation in Evolutionary Robotics;" Advances in Artificial Life, 19 pages; 1995.
Kenneally, G., et al. "Design Principles For A Family Of Direct-Drive Legged Robots;" IEEE Robotics and Automation Letters, vol. 1, No. 2; 8 pages; Jul. 2016.
Kohl, N. et al., "Policy Gradient Reinforcement Learning For Fast Quadrupedal Locomotion;" Proceedings of the IEEE International Conference on Robotics and Automation, pp. 2619-2624; May 2004.
Koos, S. et al., "Crossing The Reality Gap In Evolutionary Robotics By Promoting Transferable Controllers;" Proceedings of the 12th Annual Conference on Genetic and Evolutionary Computation, pp. 119-126. ACM, 2010.
Levine, S. et al., "Learning Complex Neural Network Policies With Trajectory Optimization;" ICML 2014: Proceedings of the 31st International Conference on Machine Learning; 9 pages; 2014.
Li, C. et al., "A Terradynamics Of Legged Locomotion On Granular Media;" Science, vol. 339; 32 pages, 2013.
Learning Hand-Eye Coordination For Robotic Grasping With Deep Learning And Large-Scale Data Collection; The International Journal of Robotics Research, vol. 37(4-5) 421-436; 2018.
Lillicrap, T. et al., "Continuous Control With Deep Reinforcement Learning;" Cornell University, arXiv.org, arXiv:1509.02971v2; 14 pages; Nov. 18, 2015.
Luo, J. et al., "Robust Trajectory Optimization Under Frictional Contact With Iterative Learning;" Autonomous Robots, 41; 9 pages; 2017.
Mordatch, I. et al., "Ensemble—CIO: Full-Body Dynamic Motion Planning That Transfers To Physical Humanoids;" 2015 IEEE/RSJ International Conference on Intelligent Robots and Systems (IROS); 8 pages; 2015.
Neunert, M. et al., Why Off-The-Shelf Physics Simulators Fail In Evaluating Feedback Controller Performance—A Case Study For Quadrupedal Robots; Advances in Cooperative Robotics, 8 pages; World Scientific, 2017.
Ogino, M. et al., "Reinforcement Learning Of Humanoid Rhythmic Walking Parameters Based On Visual Information;" Advanced Robotics; 15 pages; 2004.
Peng, X. et al., "Dynamic Terrain Traversal Skills Using Reinforcement Learning;" ACM Trans. Graph., 34(4):80:1-80:11, ISSN 0730-0301. doi: 10.1145/2766910; Jul. 2015.
Peng, X. et al., "Terrain-Adaptive Locomotion Skills Using Deep Reinforcement Learning;" ACM Transactions on Graphics (Proc. SIGGRAPH 2016), 35(4); 15 pages; 2016.
Peng, X. et al., "Sim-To-Real Transfer Of Robotic Control With Dynamics Randomization;" Cornell University, arXiv.org, arXiv:1710.06537; 8 pages; Oct. 18, 2017.

(56) References Cited

OTHER PUBLICATIONS

Peng, X. et al., Learning Locomotion Skills Using DeepRL: Does The Choice Of Action Space Matter? In Proceedings of ACM SIGGRAPH / Eurographics Symposium on Computer Animation, Article No. 12; 13 pages; Jul. 2017.
Peng, X. et al., "DeepLoco: Dynamic Locomotion Skills Using Hierarchical Deep Reinforcement Learning;" ACM Transactions on Graphics (Proc. SIGGRAPH 2017); 13 pages; 2017.
Pinto, L. et al. "Robust Adversarial Reinforcement Learning;" Cornell University, arXiv.org, arXiv:1703.02702; 10 pages; Mar. 8, 2017.
Pratt, J. et al.; "Intuitive Control Of A Planar Bipedal Walking Robot;" Proceedings of the IEEE International Conference on Robotics and Automation (ICRA), vol. 3, 8 pages; 1998.
Rajeswaran, A. et al., "EPOpt: Learning Robust Neural Network Policies Using Model Ensembles;" Cornell University, arXiv.org, arXiv:1610.01283v3; 14 pages, Dec. 16, 2016.
Rusu, A. et al., "Sim-To-Real Robot Learning From Pixels With Progressive Nets;" Cornell University, arXiv.org, arXiv:1610.04286v1; 9 pages; Oct. 13, 2016.
Schulman, J. et al., "Proximal Policy Optimization Algorithms;" Cornell University, arXiv.org, arXiv:1707.06347v2; 12 pages; Aug. 28, 2017.
Sharma, A. et al., "Phase-Parametric Policies For Reinforcement Learning In Cyclic Environments;" In AAAI Conference on Artificial Intelligence; 8 pages, Feb. 2018.
Silver, D. et al., "Mastering The Game Of Go Without Human Knowledge;" Nature, vol. 550, 18 pages; Oct. 19, 2017.
Tan, J. et al., "Simulation-Based Design Of Dynamic Controllers For Humanoid Balancing;" In 2016 IEEE/RSJ International Conference on Intelligent Robots and Systems (IROS); 8 pages; 2016.
Tassa, Y. et al. "Deep-Mind Control Suite;" Cornell University, arXiv.org, arXiv:1801.00690v1; 24 pages; Jan. 2, 2018.
Tedrake, R. et al., "Stochastic Policy Gradient Reinforcement Learning On A Simple 3d Biped;" In Proceedings 2004 IEEE/RSJ International Conference on Intelligent Robots and Systems, (IROS), pp. 2849-2854; 2004.
Tobin, J. et al. Domain Randomization For Transferring Deep Neural Networks From Simulation To The Real World;: Cornell University, arXiv.org, arXiv:1703.06907v1; 8 pages; Mar. 20, 2017.
Tzeng, E. et al., "Towards Adapting Deep Visuomotor Representations From Simulated To Real Environments;" Cornell University, arXiv.org, arXiv:1511.07111v1; 10 pages; Nov. 23, 2015.
Yu, W. et al., "Preparing for the unknown: Learning a universal policy with online system identification;" Cornell University, arXiv.org, arXiv:1702.02453v3; 10 pages; May 15, 2017.
Zhu, S. et al., "Model Identification Via Physics Engines For Improved Policy Search;" Cornell University, arXiv.org., arXiv:1710.08893v1; 8 pages; Oct. 24, 2017.
European Patent Office; Communication issued in Application No. 19727128.1, 5 pages, dated Oct. 24, 2022.
China Patent Office; First Office Action issued in Application No. 201980027638.5; 22 pages; dated Apr. 29, 2023.

\* cited by examiner

SYSTEMS AND METHODS FOR LEARNING AGILE LOCOMOTION FOR MULTIPED ROBOTS

BACKGROUND

Many robots are programmed to perform certain tasks. For example, a robot on an assembly line can be programmed to recognize certain objects, and perform particular manipulations to those certain objects.

Further, legged robots can be programmed to navigate complex terrains. Legged robots (e.g., multiped robots with two or more legs) can adjust their gait, locomotion speed, foot placement, and/or ground clearance based on different walking surfaces. For example, a bipedal robot (i.e. a robot with two legs) can walk upright like a human to navigate a variety of terrains. Additionally or alternatively, a quadruped robot (i.e. a robot with four legs) can navigate surfaces on four limbs and in some cases can mimic the motions of a variety of animals such as horses, dogs, and/or primates. However, the task of training a legged robot to walk on different surfaces can be a very complex task. Physical robots themselves can be trained to walk, but this can be particularly time consuming and in some cases ineffective. As an alternative, simulations of a physical legged robot can be trained to navigate terrains. However, translating trained simulations of a legged robot to movement in the physical legged robots can presents its own set of challenges.

SUMMARY

Implementations disclosed herein utilize deep reinforcement learning to train a model (e.g. a deep neural network model) that can be utilized to determine locomotion for a legged robot such as a quadruped robot, or other multiped robot. Implementations additionally or alternatively can relate to the utilization of such a model in controlling a multiped robot. The robotic locomotion in some of those implementations can be determined in part by a locomotion controller which can be decoupled into an open loop component and a feedback component. The open loop component can receive information that is based on input from a user and that is used in training robotic locomotion. The received information can include, for example, information that directly or indirectly defines robot gait, robot height, and/or other control parameter(s). In several implementations, the information that is provided to the open loop component can be in the form of a reference trajectory (e.g., sine wave) that is generated based on user input. The feedback loop component can fill in missing portions of information, for example the control of joint angles, base orientation, angular velocities, and/or other missing portions of information, such that the legged robot can still walk with respect to the user provided input to the open loop component. For example, the feedback loop component can be trained using reinforcement learning to determine the balance control (which can be tedious to design manually) for a user provided reference trajectory. Additionally or alternatively, the observation space can be reduced, which can make training simulations easier to translate to the real world. In some implementations, the observation space can be reduced by reducing the amount of sensor data used in training a legged robot for locomotion tasks.

In some additional or alternative implementations, robotic locomotion can be generated by a control policy controller (such as a locomotion policy controller), which can be decoupled into an open loop pattern generator and a neural network feedback component. A user can control the open loop pattern generator in training robotic locomotion by providing the open loop pattern generator control parameter(s) such as leg gait, leg height, and/or other control parameter(s). The neural network feedback component can fill in missing portions of information (e.g., the control of joint angles, base orientation, angular velocities), such that the legged robot can still walk with respect to phase information provided by the open loop pattern generator and the user provided control parameters. In some implementations, the open loop pattern generator can create an asymmetric sine curve to provide to the neural network feedback component. The asymmetric sine curve can include a swing phase and a stance phase. The swing phase generally indicates one or more robotic legs are moving off the ground, and the stance phase generally indicates one or more robotic legs are positioned on the ground. In a variety of implementations, a user can provide robotic parameters to dynamically change robotic locomotion behavior even after the neural network feedback controller has been trained. For example, a user can dynamically change the speed, or gait of a robot after training by changing the user provided controlled parameters.

In some implementations, a method performed by one or more processors is provided that includes: receiving an instance of sensor data, the instance of sensor data generated based on output from one or more sensors of a robot, wherein the instance of sensor data is based on a state of the robot following control of the robot using a prior instance of robot control parameters generated using a neural network model, the neural network model representing a learned policy for a robotic locomotion task and being previously trained through reinforcement learning. The method further includes receiving a reference trajectory for the robotic locomotion task, wherein the reference trajectory is decoupled from the sensor data and is influenced by user interaction via one or more user interface input devices. The method further includes generating an observation based on the instance of sensor data; and applying the observation and the reference trajectory to the neural network model to generate a current instance of robot control parameters. The method further includes controlling one or more actuators of a robot based on the current instance of robot control parameters.

These and other implementations can include one or more of the following features.

In some implementations, the robot is a legged robot includes a plurality of legs, and wherein the current instance of robot control parameters define, for each of the plurality of legs, a desired pose of the leg.

In some implementations, the generated observation indicates motor angles, roll of a base of the robot, pitch of a base of the robot, and angular velocity of the robot.

In some implementations, the generated observation indicates only the motor angles, the roll, the pitch, and the angular velocity of the robot.

In some implementations, the generated observations exclude one or more available observations that are indicated by the instance of sensor data.

In some implementations, the excluded one or more available observations include a yaw of the base of the robot.

In some implementations, the method further includes training the neural network model in a simulator using a simulated robot and using reinforcement learning.

In some implementations, training the neural network model in simulation includes modeling, for the simulated robot, a simulated latency between: the time when the output from one or more sensors of the robot is captured, and the time when one or more actuators of the robot are controlled based on the current instance of robot control parameters.

In some implementations, training the neural network model in simulation using reinforcement learning includes utilizing a reward function, during the reinforcement learning, wherein the utilized reward function penalizes a high robot energy consumption.

In some implementations, wherein the utilized reward function further encourages a faster forward robot speed.

In some implementations, the robot is a quadruped robot.

In some implementations, the reference trajectory indicates a robot gait and a robot height.

In some implementations, the reference trajectory include a symmetric sine function.

In some implementations, the locomotion task is trotting.

In some implementations, the locomotion task is galloping.

In some implementations, the one or more sensors are one or more motor encoders and one or more inertial measurement units.

In some implementations, a method implemented by one or more processors is provided and includes receiving an instance of sensor data, the instance of sensor data generated based on output from one or more sensors of a sensor component of a robot. The method further includes generating an observation based on the instance of sensor data for performing a robot action based on a neural network model representing a learned policy for a locomotion task for the robot, wherein the neural network model is decoupled into a pattern generator component and a neural network feedback component. The method further includes receiving controlled parameters based on user interaction with a user interface input device, wherein a user can change the controlled parameters at the user interface input device after the neural network model representing the reinforcement learning policy is trained. The method further includes applying the controlled parameters to the pattern generator component to generate pattern generator phase data. The method further includes applying the observation, the control parameters, and the pattern generator phase data to the neural network feedback component to generate robot control parameters. The method further includes controlling one or more actuators of a robot based on the robot control parameters.

In some implementations, the robot is a quadruped robot.

In some implementations, the controlled parameters are selected from the group consisting of gait, speed of locomotion, and height of locomotion.

In some implementations, generating pattern generator phase comprises generating parameterizing an asymmetric sine curve.

In some implementations, the asymmetric sine curve comprises a swing phase and a stance phase, wherein the swing phase indicates one or more legs of the quadruped robot are off the ground and the stance phase indicates one or more legs of the quadruped robot are on the ground.

In some implementations, the controlled parameters change the asymmetric sine curve.

In some implementations, the locomotion task is trotting.

In some implementations, the locomotion task is galloping.

In some implementations, the one or more sensors are one or more motor encoders and one or more inertial measurement units.

Other implementations may include a non-transitory computer readable storage medium storing instructions executable by one or more processors (e.g., one or more central processing units to perform a method such as one or more of the methods described above and/or elsewhere herein. Yet another implementation may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Various implementations are disclosed below that are related to training and/or utilizing a machine learning model (e.g., a neural network model) in locomotion for a legged robot, such as a quadruped robot. In some implementations disclosed herein, the machine learning model is trained utilizing reinforcement learning and, when trained, represents a policy for use in generating control parameters that can be utilized in driving actuators of a legged robot to control locomotion of the legged robot. In some versions of those implementations, the control parameters generated at a given time utilizing such a model can be based on user input to an open loop component of a locomotion controller. Additionally or alternatively, the control parameters can be based on user provided controlled parameters to a pattern generator component of a control policy controller.

Robotic locomotion tasks can be learned in many implementations through reinforcement learning. The goal in reinforcement learning is to control an agent attempting to maximize a reward function which, in the context of a robotic skill (also referred to herein as a task), denotes a user-provided definition of what the robot should try to accomplish. At state $x_t$ in time t, the agent chooses and executes action $u_t$ according to its policy $\pi(x_t)$, transitions to a new state $x_{t+1}$ according to the dynamics of the robot $p(x_t,u_t,x_{t+1})$, and receives a reward $r(x_t, u_t)$. The goal of reinforcement learning is to find the optimal policy $\pi^*$ which maximizes the expected sum of rewards from an initial state distribution. The reward is determined based on the reward function which, as mentioned above, is dependent on the robotic task to be accomplished. Accordingly, reinforcement learning in the robotics context seeks to learn an optimal policy for performance of a given robotic task (e.g., robotic locomotion).

Figure 1:
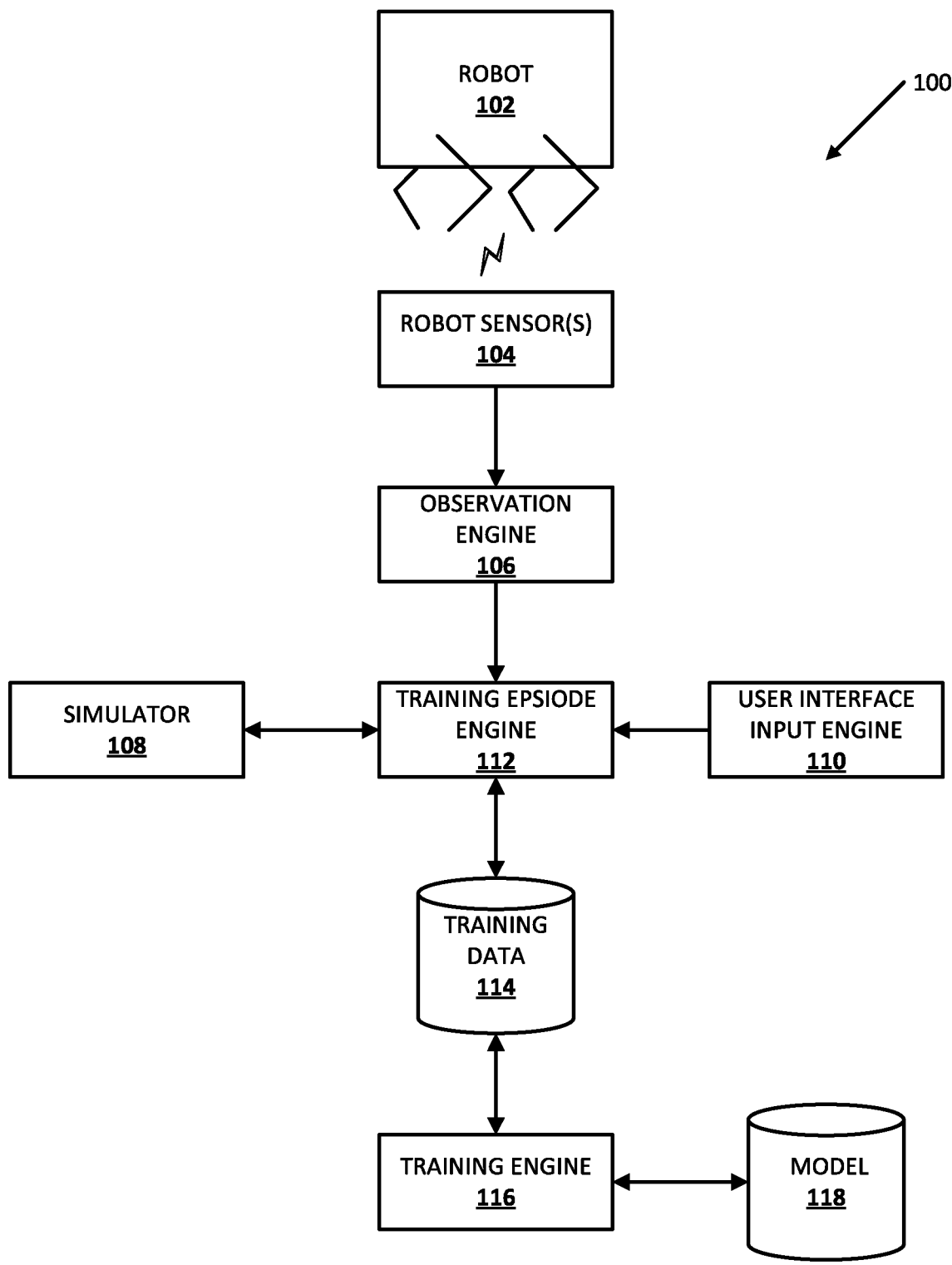
FIG. 1 illustrates an example environment in which various implementations can be implemented.

Turning to the figures, FIG. 1 illustrates an example environment 100 in which implementations described herein may be implemented. FIG. 1 includes an example robot 102, an observation engine 106, a robotic simulator 108, a user interface input engine 120, a training episode engine 112, and a training engine 116. Also included are robot senor(s) 104, training data 114, and one or more machine learning models 118.

Robot 102 is a legged robot having multiple degrees of freedom to enable robotic locomotion by controlling actuator(s) of the legs of the robot 102. For example, robot 102 can be a quadruped robot (i.e., four legged robot), where each leg is controlled by two actuators that allow the leg to move in the sagittal plane. For instance, a first actuator of a corresponding leg can be at an attachment point between the leg and a body of the robot 102, and a second actuator of the corresponding leg can be between the attachment point and a distal end of the corresponding leg (e.g., at a "knee" of the leg). The motors can be actuated through position control, with a Power Width Modulation (PWM) signal. Other quantities of motors and/or other motor control methodologies (besides PWM) can be utilized in some implementations.

In a variety of implementations, robot 102 is equipped with a variety of robot sensors 104, such as motor encoders that measure the motor angles, an inertial measurement unit (IMU) that measures the orientation and angular velocity of the robot base, and/or additional sensors to measure the position of the robot. Although a particular robot 102 is illustrated in FIG. 1, additional and/or alternative robots may be utilized including robots having more legs (e.g., a five legged robot, a six legged robot, an eight legged robot, and/or a robot with additional legs), robots having fewer legs (e.g., a three legged robot, a two legged robot), robots having robot arms, robots having a humanoid form, robots having an animal form, robots that include one or more wheels in addition to robot legs, and so forth.

Training machine learning models based on data from real-world physical robots can be time consuming (e.g., actually navigating a large quantity of paths requires a large quantity of time), can consume a large amount of resources (e.g., power required to operate the robots), and/or can cause wear and tear on the robots being utilized. In view of these and/or other considerations, robotic simulators (such as robotic simulator 108) can be utilized in generating simulated training data that can be utilized in training of machine learning models (such as model 118). However, there is often a meaningful "reality gap" that exists between real robots and real environments and the simulated robots and/or simulated environments simulated by a robot simulator.

In many implementations, the reality gap can be decreased by adapting the simulator (e.g., simulator 108) and/or data generated using the simulator (e.g., the simulated robot, the simulated environment, and/or additional data generated using the simulator). For example, the actuator model that is utilized in simulator 108 can be designed to more accurately simulate a robotic actuator. In a variety of implementations, this increased accuracy of simulated actuator(s) can decrease the reality gap.

For example, a large reality gap can be found when simulating actuator(s) using traditional approaches. For example, one constraint $e_{n+1}=0$ is formulated for each motor where $e_{n+1}$ is an error at the end of the current time step. The error can be defined as $$e_{n+1}=k_p(\underline{q}-q_{n+1})+k_d(\underline{\dot{q}}-\dot{q}_{n+1}) \quad (1)$$

where $\underline{q}$ and $\underline{\dot{q}}$ are desired motor angle and velocity, $q_{n+1}$ and $\dot{q}_{n+1}$ are the motor angle and velocity at the end of the current time step, $k_p$ is the proportional gain and $k_d$ is the derivative gain. Equation (1) ensures the motor angle and velocity in the future (i.e., at the end of the time step) satisfy the error constraint $e_{n+1}$. This increases motor stability in simulation if large gains are used, but the motors could oscillate in reality.

To eliminate this discrepancy for actuators, many implementations utilize an actuator model according to the dynamics of an ideal DC motor. Given a PWM signal, the torque of the motor can be represented as $$\tau = K_t I \quad (2)$$

$$I = \frac{V * PWM - V_{emf}}{R} \quad (3)$$

$$V_{emf} = K_t \dot{q} \quad (4)$$

where I is the armature current, $K_t$ is the torque constant or back electromotive force (EMF) constant, V is the supplied voltage, $V_{emf}$ is the back EMF voltage, and R is the armature resistance. The parameters $K_t$ and R can be determined by the specific actuators. Utilizing the motor model represented in equations (2)-(4) in training a controller, a robot often sinks to its feet and cannot lift while the same controller works fine in simulation because the linear torque-current relation only holds for ideal motors. In reality, the torque saturates as the current increases. A piecewise linear function can be utilized to characterize this nonlinear torque-current relation. In simulation, once the current is computed from PWM (equations (3) and (4)), the piece-wise function can be utilized to look up the corresponding torque.

The PWM is controlled through a classic PD servo in the positional control mode.

$$\text{PWM}=k_p(\underline{q}-q_n)+k_d(\underline{\dot{q}}-\dot{q}_n) \quad (5)$$

Additionally or alternatively, the target velocity can be set to zero (i.e., $\underline{\dot{q}}=0$). Actuating a motor with a desired trajectory of sine curve using this actuator model agrees with the ground truth.

In many implementations, latency simulated using simulator 108 can provide for an additional and/or alternative reduction in the reality gap. Latency is a cause of instability for feedback control and can include: the time delay between when a motor command is sent that causes the state of the robot to change and the robot receives the motor command, the time delay between when the robot receives the motor command and the state of the robot changes, the time delay between when the sensor measurement of the change in state is captured at the robot and reported back to the controller, and/or additional delay(s). Robotic simulators where motor commands take effect immediately and the sensors report back the state instantaneously make the stability region of a feedback controller in simulation much larger than its implementation on hardware. This can cause a feedback policy learned in simulation start to oscillate, diverge, and ultimately fail in the real world. Accordingly, latency simulation techniques disclosed herein are utilized to mitigate these and/or other drawbacks, leading to mitigation of the reality gap and improved performance of a model, trained at least in part on simulated data, when utilized to control a real robot.

To model latency in accordance with simulator 108, a history can be kept of observations and their measurement time $\{(t_i, O_i)_{i=0, 1, \ldots, n-1}\}$, where $t_i = i\Delta t$ and $\Delta t$ is the time step. At the current step n, when the controller needs an observation, simulator 108 can search through the history to find two adjacent observations $O_i$ and $O_{i+1}$ where $t_i \leq n\Delta t - t_{latency} \leq t_{i+1}$ and linearly interpolate them. To measure latency on the physical system, a spike of PWM signal (e.g., PWM=1 for only one time step) can be sent that causes a sudden change of the motor angle. The time delay between when the spike is sent and when the resultant motor movement is reported can be measured.

Observation engine 106 can utilize data measured by robot sensor(s) 104 to determine a variety of observations. The observations can include one or multiple of the roll of the robot base, the pitch of the robot base, angular velocities of the robot base along one or more axes (such as an angular velocity of the robot base along the axis corresponding with roll and/or an angular velocity of the robot base along the axis corresponding with pitch), motor angles corresponding to motor(s) of the robot legs, and/or other observations. In many implementations, the observation space can be limited to exclude unreliable measurements including measurements with a high level of noise such as motor velocities, measurements that can drift quickly such as the yaw of the robot base, and/or other unreliable measurements. Keeping the observation space compact helps transfer a policy trained in simulation to the real robot.

Figure 5:
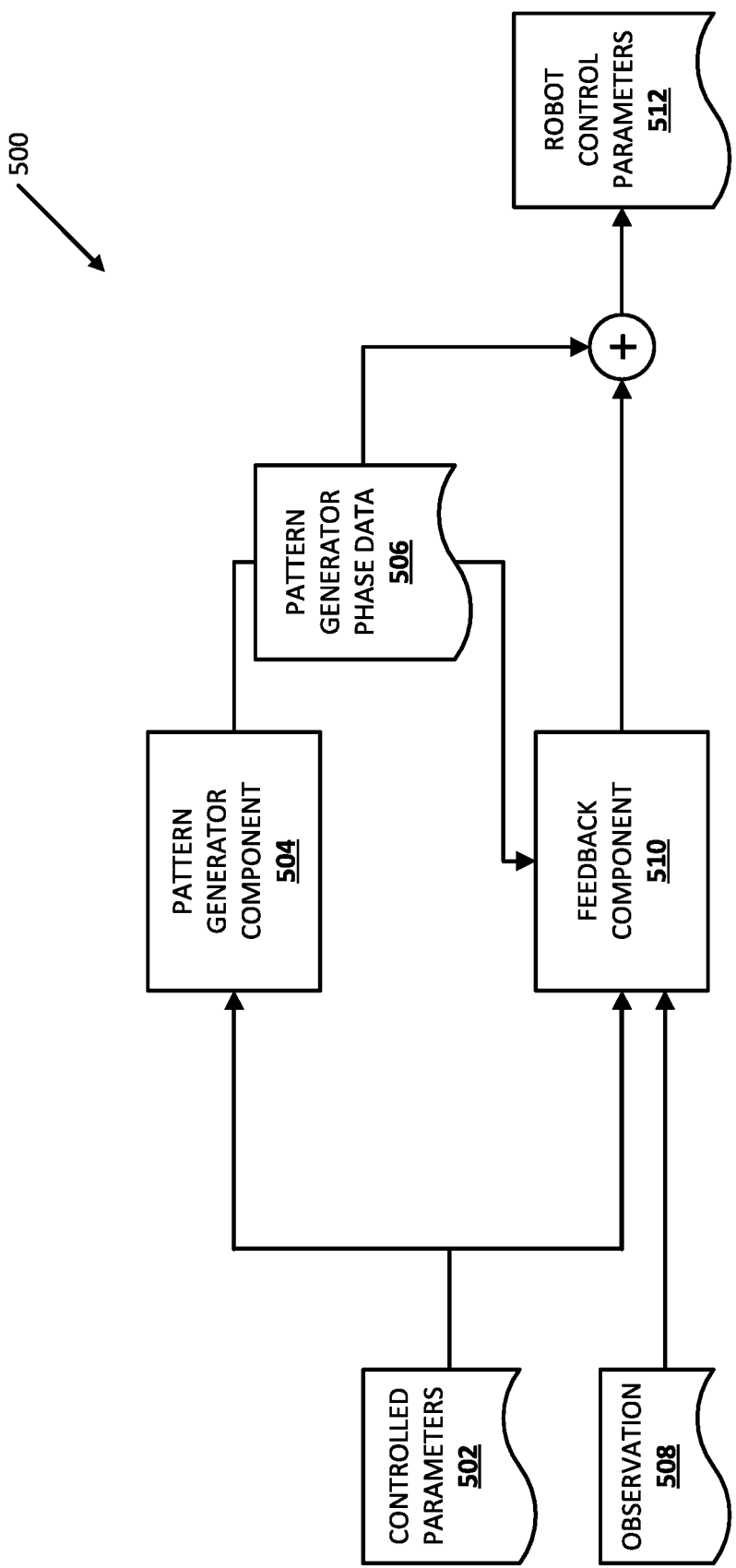
FIG. 5 illustrates another example of a neural network model according to implementations disclosed herein.

User interface input engine 110 can capture a variety of user inputs for use in training the machine learning model 118 as well as controlling the locomotion of a real robot. For example, a user can provide a reference trajectory (as illustrated in FIG. 2), controlled parameters (as illustrated in FIG. 5) and/or additional user interface input for use in training machine learning model 118.

Training episode engine 112, in accordance with a variety of implementations, can be utilized in generating reinforcement learning training episodes, such as training data 114. For example, training episode engine 112 can create a training episode using data generated by simulator 108 and user interface input engine 110. Additionally or alternatively, observations generated using observation engine 106 can be utilized by training episode engine 112 to generate training episodes. Training engine 116 can utilize training data 114 generated by training episode engine 112 to train machine learning model 118. In a variety of implementations, machine learning model 118 is a neural network model, which is a decoupled network and can include a convolutional neural network model, a recurrent network model, and/or an additional type of neural network model. Machine learning model 118 in a variety of implementations is trained by training engine 116 using reinforcement learning. An example machine learning model 118 is illustrated in FIG. 2. An additional or alternative machine learning model 118 is illustrated in FIG. 5.

Figure 2:
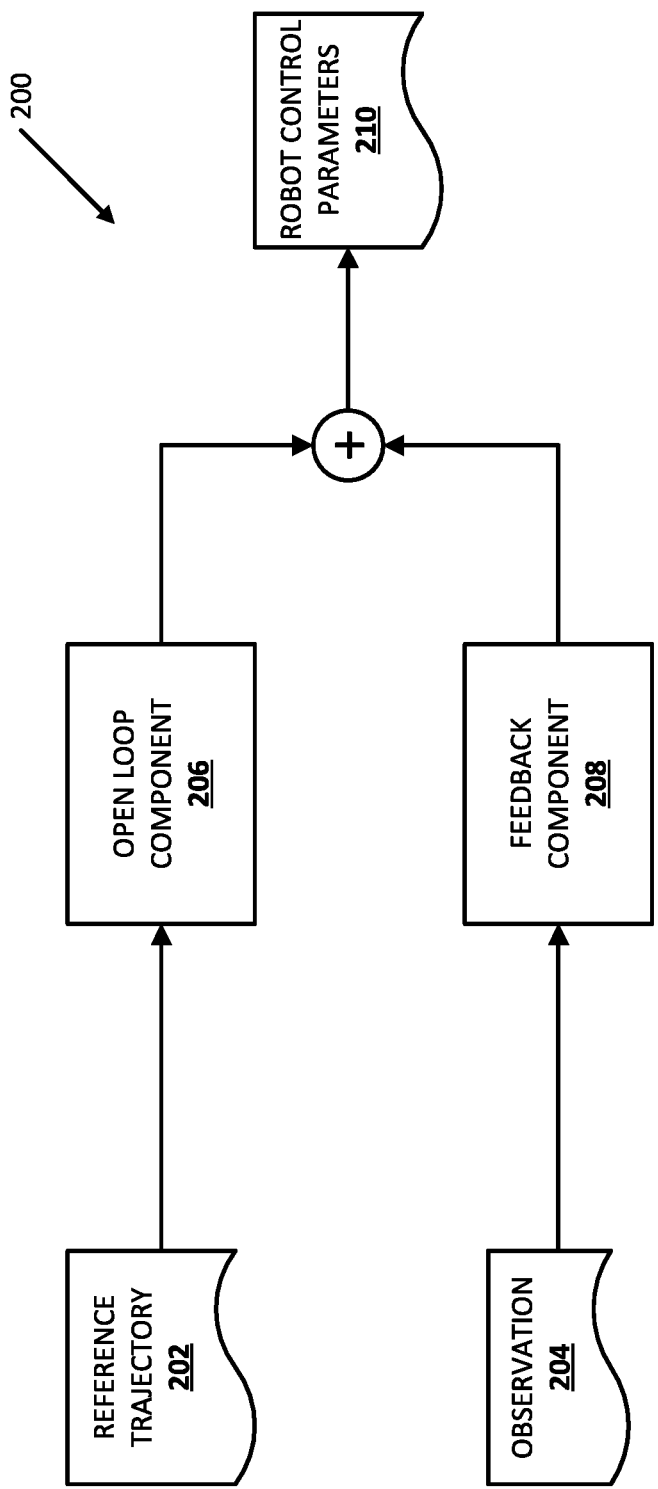
FIG. 2 illustrates an example neural network model according to implementations disclosed herein.

Turning to FIG. 2, block diagram 200 illustrates a decoupled machine learning model (such as machine learning model 118 of FIG. 1) in accordance with implementations described herein. In many implementations, the machine learning model is decoupled into an open loop component 206 and a feedback component 208. The decoupled machine learning model allows a user more control over the training of the locomotion policy. Open loop component 206 allows a user to provide a reference trajectory 202 (e.g., a user supplied symmetric sine curve) to express, for example, the desired gait of the robot. The feedback component 208 of the machine learning model adjusts the leg poses on top of the reference trajectory 202 based on the observation 204 indicating the current state of the robot (such as simulated observation determined using simulator 108 and/or observations from the real robot determined using observation engine 106).

The policy of the network may be represented as:

$$a(t,o) = \underline{a}(t) + \pi(o) \quad (6)$$

where a(t,o) is the machine learning model with respect to the reference trajectory 202 and observation 204, $\underline{a}(t)$ is the open loop component 206, $\pi(o)$ is the feedback component 208, t is the time and o is observation 204. This represents a hybrid policy that provides a full spectrum of robot controllability. It can be varied to determine robot locomotion from fully user-specified to entirely learned from scratch. For example, a user-specified policy can be used by setting both the lower and upper bounds of $\pi(o)$ (i.e., the feedback component) to zero. Additionally or alternatively, a policy can be learned from scratch by setting $\underline{a}(t)=0$ (i.e., setting the open loop component to equal zero) and giving the feedback component $\pi(o)$ a wide output range. In many implementations, the amount of user control applied to the system can be determined by varying the open loop signal and/or the output bound of the feedback component.

Figure 3:
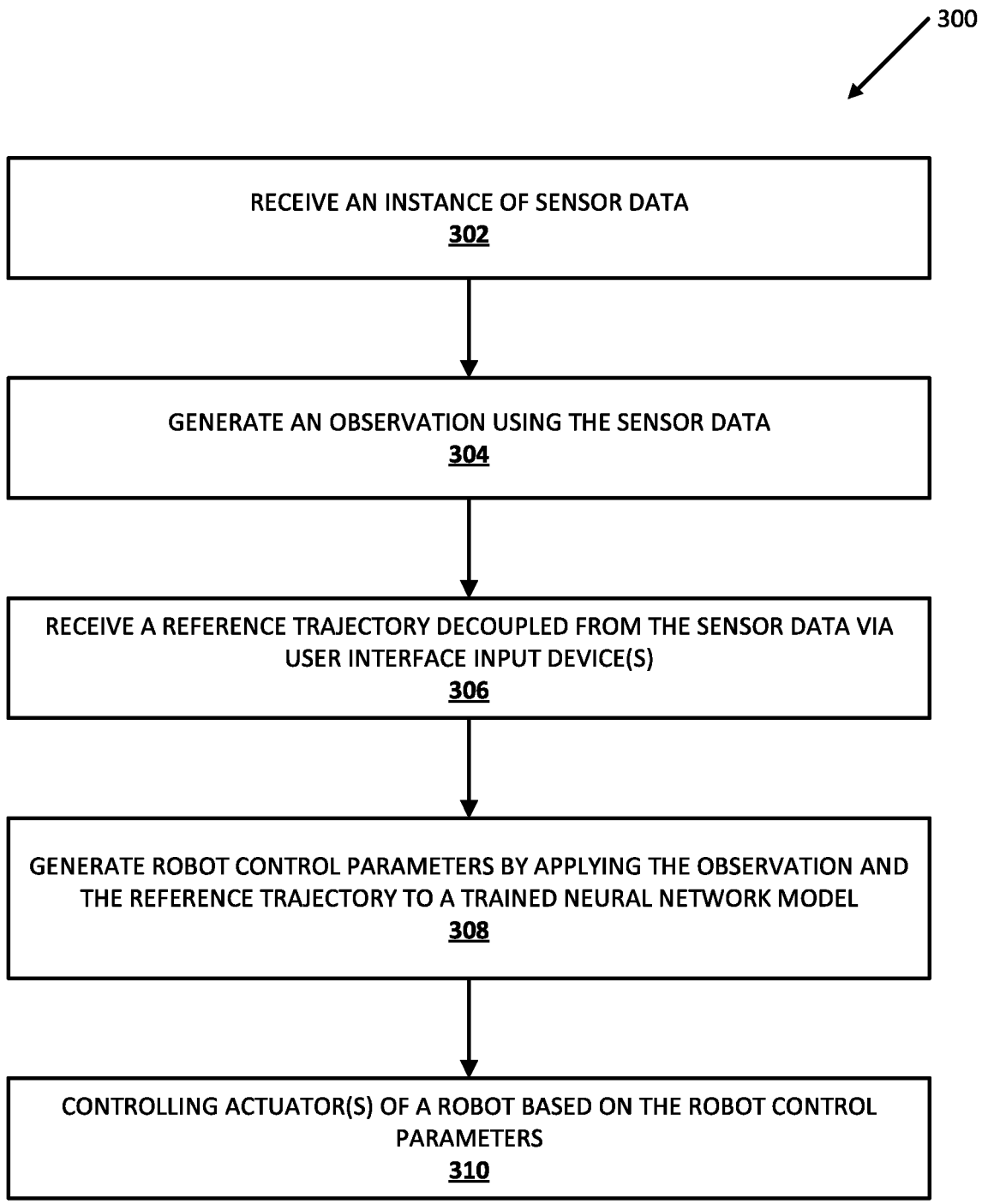
FIG. 3 is a flowchart illustrating an example process of controlling actuator(s) of a robot based on robot control parameters generated using a neural network model according to implementations disclosed herein.

FIG. 3 is a flowchart illustrating an example process 300 of generating robot control parameters to control robot locomotion using a decoupled neural machine learning model. For convenience, the operations of process 300 are described with reference to a system that performs the operations. This system may include various components of various computer systems, such as one or more components depicted in FIG. 8 and/or FIG. 9. Moreover, while operations of process 300 are shown in a particular order, this is not meant to be limiting. One or more operations by be reordered, omitted, and/or added.

At block 302, the system receives an instance of sensor data. Sensor data can be captured by a variety of sensors (e.g., motor encoder(s), IMU, and/or additional sensor(s)) and is based on the state of the robot (e.g., motor angle(s), orientation of the robot, velocity of the robot, etc.). In many implementations, the sensor data is based on the state of the robot following control of the robot using a prior instance of robot control parameters.

At block 304, the system generates an observation using the sensor data. For example, the system can limit the observation space to exclude measurements that drift quickly and/or typically contain large amounts of noise. For example, the observation space can be limited to the roll of the base, the pitch of the base, the angular velocities of the base along the roll and pitch axes, and the motor angles of the robot leg motors (e.g., 8 motor angles where each leg of a quadruped robot includes two motors).

At block 306, the system receives a reference trajectory decoupled from the sensor data via user interface input device(s). The reference trajectory can define a user specified desired gait. In many implementations, the reference trajectory is a symmetric sine curve.

At block 308, the system generates robot control parameters by applying the observation and the reference trajectory to a trained machine learning model. Robot control parameters can indicate the desired pose of the robot at the next state. In a variety of implementations, robot control parameters can indicate the desired change from the current state to the next desired state.

At block 310, the system controls actuator(s) of a robot based on the robot control parameters.

Figure 4:
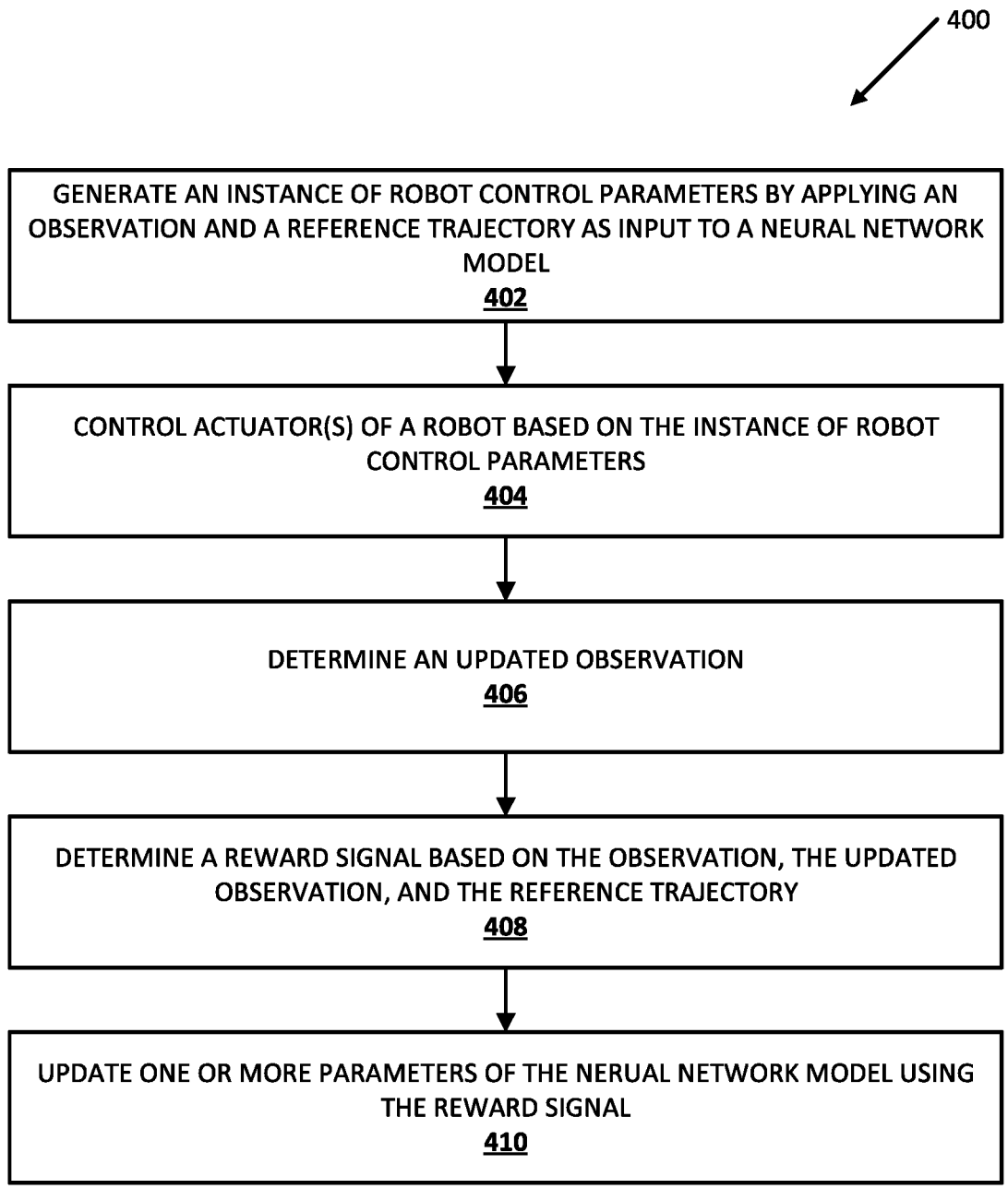
FIG. 4 is another flowchart illustrating an example process of training a neural network model according to implementations disclosed herein.

FIG. 4 is a flowchart illustrating an example process 400 of training a decoupled machine learning model for robotic locomotion. For convenience, the operations of process 400 are described with reference to a system that performs the operations. This system may include various components of various computer systems, such as one or more components depicted in FIG. 8 and/or FIG. 9. Moreover, while operations of process 400 are shown in a particular order, this is not meant to be limiting. One or more operations by be reordered, omitted, and/or added.

At block 402, the system generates an instance of robot control parameters by applying an observation and a reference trajectory as input to a machine learning model. In some implementations, the instance of robot control parameters is generated using a robotic simulator such as simulator 108 of FIG. 1.

At block 404, the system controls actuator(s) of a robot based on the instance of robot control parameters. For example, the system can control the motor angle of one or more motors of the robot legs.

At block 406, the system determines an updated observation. In a variety of implementations, the updated observation is based on: the position of the robot, IMU readings, motor angle(s), and/or additional sensor measurements of the robot after the system controls actuator(s) of the robot at block 404.

At block 408, the system determines a reward signal based on the observation, the updated observation, and the reference trajectory. In a variety of implementations, the reward signal can be determined using a reward function which encourages faster forward running speed and/or penalizes high energy consumption. For example, a reward function can include:

$$r = (p_n - p_{n-1}) \cdot d - w\Delta t |\tau_n \cdot \dot{q}n| \quad (7)$$

where $p_n$ is the position of the robot base at the current time step, $p_{n-1}$ is the position of the robot base at the previous time step, d is the desired running direction, $\Delta t$ is the time step, $\tau$ are the motor torques, and $\dot{q}$ are the motor velocities. The first term measures the running distance towards the desired direction and the second term measures the energy expenditure. $\omega$ is a weight that balances these two terms.

At block 410, the system updates one or more parameters of the machine learning model using the reward signal. In many implementations, the rewards are accumulated at each episode. In some implementations, a training episode terminates after a specific robot condition is met such as: the robot has taken a desired number of steps (e.g., the training episode terminates after the robot has taken 1000 steps) and/or the robot loses balance (e.g., the robot base tilts more than 0.5 radians with respect to the ground plane).

Turning to FIG. 5, block diagram 500 illustrates an additional and/or alternative machine learning model (such as machine learning model 118 of FIG. 1). In many implementations, the machine learning model is decoupled into a pattern generator component 504 and a feedback component 510. In many implementations, a user can supply controlled parameters 502 such as desired locomotion speed, walking height, and/or additional user supplied parameters to generate pattern generator phase data 506. In other words, changing one or more controlled parameters 502 will change the pattern generator phase data 506 generated using pattern generator component 504. In many implementations, pattern generator phase data 506 provides a reference of the overall behavior of the robot locomotion (such as the trajectory of the legs), and can be represented by asymmetric sine curves.

One or more observations 508 indicating the current state of the robot (such as simulated observations determined using simulator 108 and/or observations captured from a real robot using observation engine 106 of FIG. 1) can be provided as input to feedback component 510 of the decoupled neural network. In many implementations, controlled parameters 502 and/or pattern generator phase data 506 may additionally or alternatively be processed as input using feedback component 510. Output generated by feedback component 510 may be combined with pattern generator phase data 506 to determine one or more robot control parameters 512.

Figure 6:
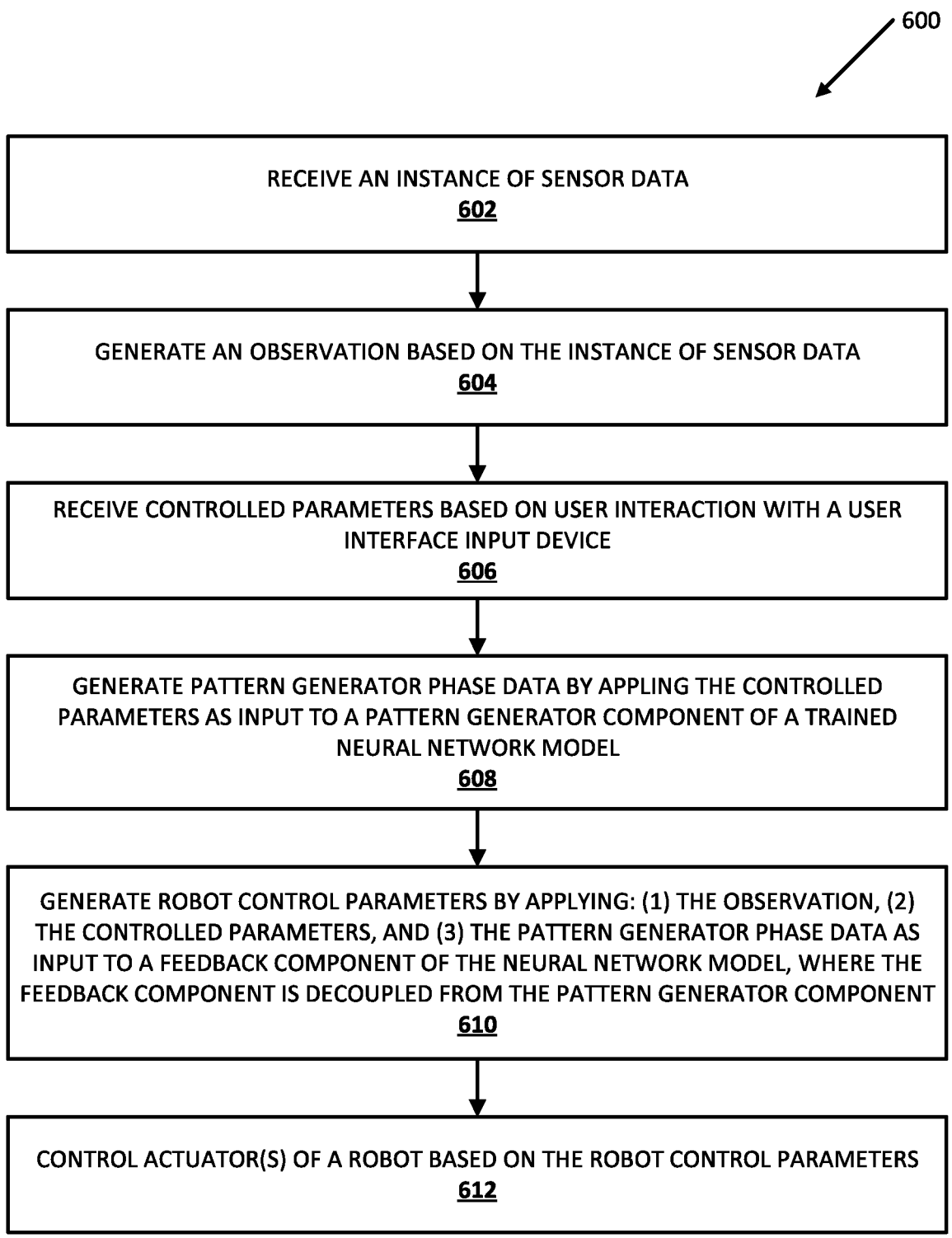
FIG. 6 is another flowchart illustrating another example process of controlling actuator(s) of a robot based on robot control parameters generated using a neural network model according to implementations disclosed herein.

FIG. 6 is a flowchart illustrating an example process 600 of generating robot control parameters using a decoupled machine learning model in accordance with a variety of implementations. For convenience, the operations of process 600 are described with reference to a system that performs the operations. This system may include various components of various computer systems, such as one or more components depicted in FIG. 8 and/or FIG. 9. Moreover, while operations of process 600 are shown in a particular order, this is not meant to be limiting. One or more operations by be reordered, omitted, and/or added.

At block 602, the system receives an instance of sensor data. As discussed above, sensor data can be captured by a variety of sensors (e.g., motor encoder(s), IMU, and/or additional sensor(s)) and is based on the state of the robot. In many implementations, the sensor data is based on the state of the robot following control of the robot using a prior instance of robot control parameters.

At block 604, the system generates an observation based on the instance of sensor data. For example, the system can limit the observation space to exclude measurements that drift quickly and/or typically contain large amounts of noise. In many implementations, the observation space is limited to the roll of the base, the pitch of the base, the angular velocities along the roll and pitch axes, and the motor angles of robot leg motors.

At block 606, the system receives controlled parameters based on user interaction with a user interface input device. Controlled parameters can include one or more parameters defining a desired gait of the robot and can include locomotion speed, foot placement, ground placement, and/or additional parameter(s).

At block 608, the system generates pattern generator phase data by applying the controlled parameters as input to a pattern generator component of a trained machine learning model. In many implementations, the pattern generator phase data is an asymmetric sine curve representing the swing phase and the stance phase of a robotic leg.

At block 610, the system generates robot control parameters by applying: (1) the observation, (2) the controlled parameters, and (3) the pattern generator phase data as input to a feedback component of the machine learning model. In many implementations, the feedback component of the machine learning model is decoupled from the pattern generator component of the machine learning model.

At block 612, the system controls actuator(s) of a robot based on the robot control parameters.

Figure 7:
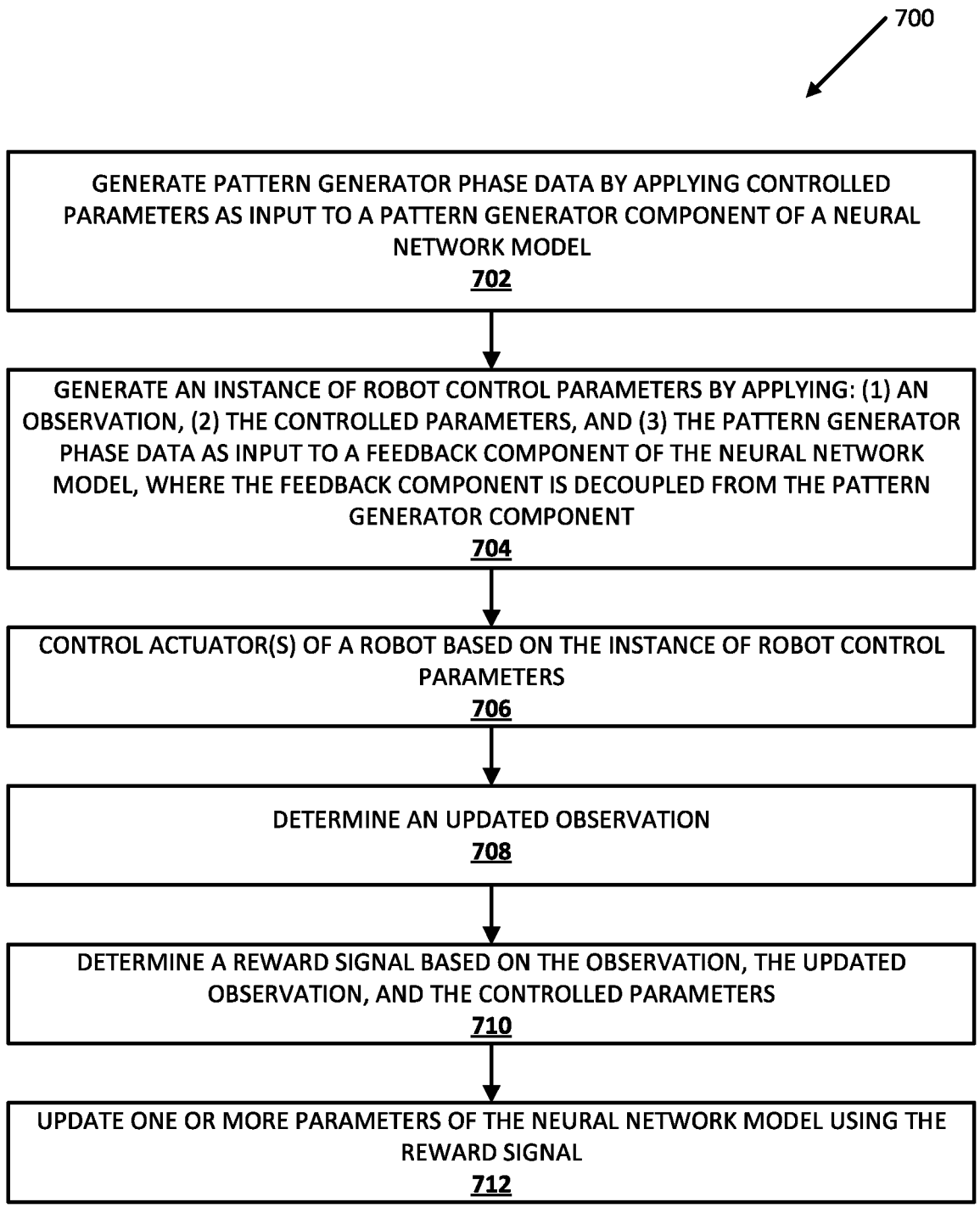
FIG. 7 is another flowchart illustrating another example process of training a neural network model according to implementations disclosed herein.

FIG. 7 is a flowchart illustrating an example process 700 of training a machine learning model for robotic locomotion in accordance with a variety of implementations. For convenience, the operations of process 700 are described with reference to a system that performs the operations. This system may include various components of various computer systems, such as one or more components depicted in FIG. 8 and/or FIG. 9. Moreover, while operations of process 700 are shown in a particular order, this is not meant to be limiting. One or more operations by be reordered, omitted, and/or added.

At block 702, the system generates pattern generator phase data by applying controlled parameters as input to a pattern generator component of a machine learning model. In a variety of implementations, the controlled parameters are provided to the system by a user.

At block 704, the system generates an instance of robot control parameters by applying: (1) an observation, (2) the controlled parameters, and (3) the pattern generator phase data as input to a feedback component of the machine learning model. In many implementations, the feedback component of the machine learning model is decoupled from the pattern generator component.

At block 706, the system controls actuator(s) of a robot based on the instance of robot control parameters. For example, the system can move one or more legs of the robot by controlling actuator(s) of the robot.

At block 708, the system determines an updated observation. In many implementations, the updated observation is determined using feedback data captured by one or more sensors of the robot.

At block 710, the system determines a reward signal based on the observation, the updated observation, and the controlled parameters. In some implementations, the reward signal optimizes energy efficient locomotion. In some implementations, the reward signal is similar to the reward signal determined at block 408 of FIG. 4.

At block 712, the system updates one or more parameters of the machine learning model using the reward signal. For example, one or more weights of the feedback component of the machine learning model can be updated. In many implementations, the rewards are accumulated at each episode. In some implementations, a training episode terminates after a specific robot condition is met such as: the robot has taken a desired number of steps (e.g., the training episode terminates after the robot has taken 1000 steps) and/or the robot loses balance (e.g., the robot base tilts more than 0.5 radians with respect to the ground plane).

Figure 8:
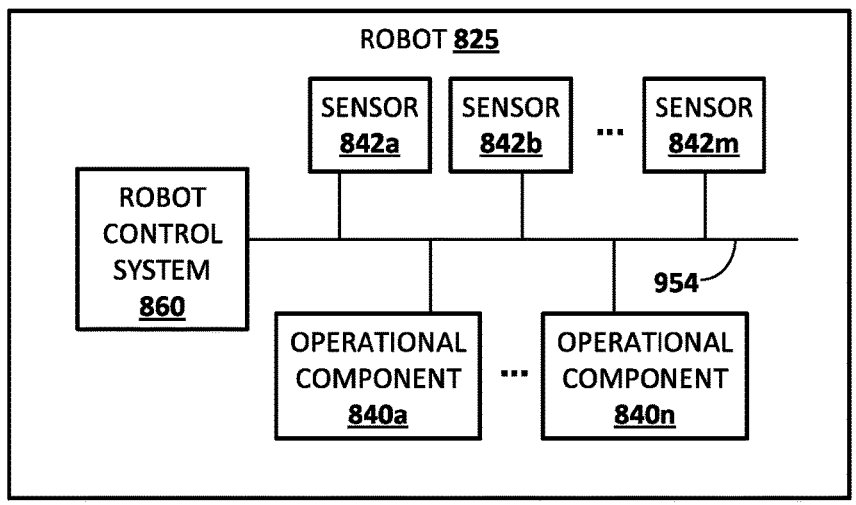
FIG. 8 schematically depicts an example architecture of a robot.

FIG. 8 schematically depicts an example architecture of a robot 825. The robot 825 includes a robot control system 860, one or more operational components 825a-825n, and one or more sensors 842a-842m. The sensors 842a-842m may include, for example, vision sensors, light sensors, pressure sensors, pressure wave sensors (e.g., microphones), proximity sensors, accelerometers, gyroscopes, thermometers, barometers, and so forth. While sensors 842a-m are depicted as being integral with robot 825, this is not meant to be limiting. In some implementations, sensors 842a-m may be located external to robot 825, e.g., as standalone units.

Operational components 840a-840n may include, for example, one or more end effectors and/or one or more servo motors or other actuators to effectuate movement of one or more components of the robot. For example, the robot 825 may have multiple degrees of freedom and each of the actuators may control actuation of the robot 825 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 825. In some implementations, the robot 825 may comprise a "brain box" that may include all or aspects of the control system 860. For example, the brain box may provide real time bursts of data to the operational components 840a-n, with each of the real time bursts comprising a set of one or more control commands that dictate, inter alia, the parameters of motion (if any) for each of one or more of the operational components 840a-n. In some implementations, the robot control system 860 may perform one or more aspects of processes 300, 400, 500, and/or 700 described herein. As described herein, in some implementations all or aspects of the control commands generated by control system 860 can position limb(s) of robot 825 for robotic locomotion tasks. Although control system 860 is illustrated in FIG. 8 as an integral part of robot 825, in some implementations, all or aspects of the control system 860 may be implemented in a component that is separate from, but in communication with robot 825. For example, all or aspects of control system 860 may be implemented on one or more computing devices that are in wired and/or wireless communication with the robot 825, such as computing device 910.

Figure 9:
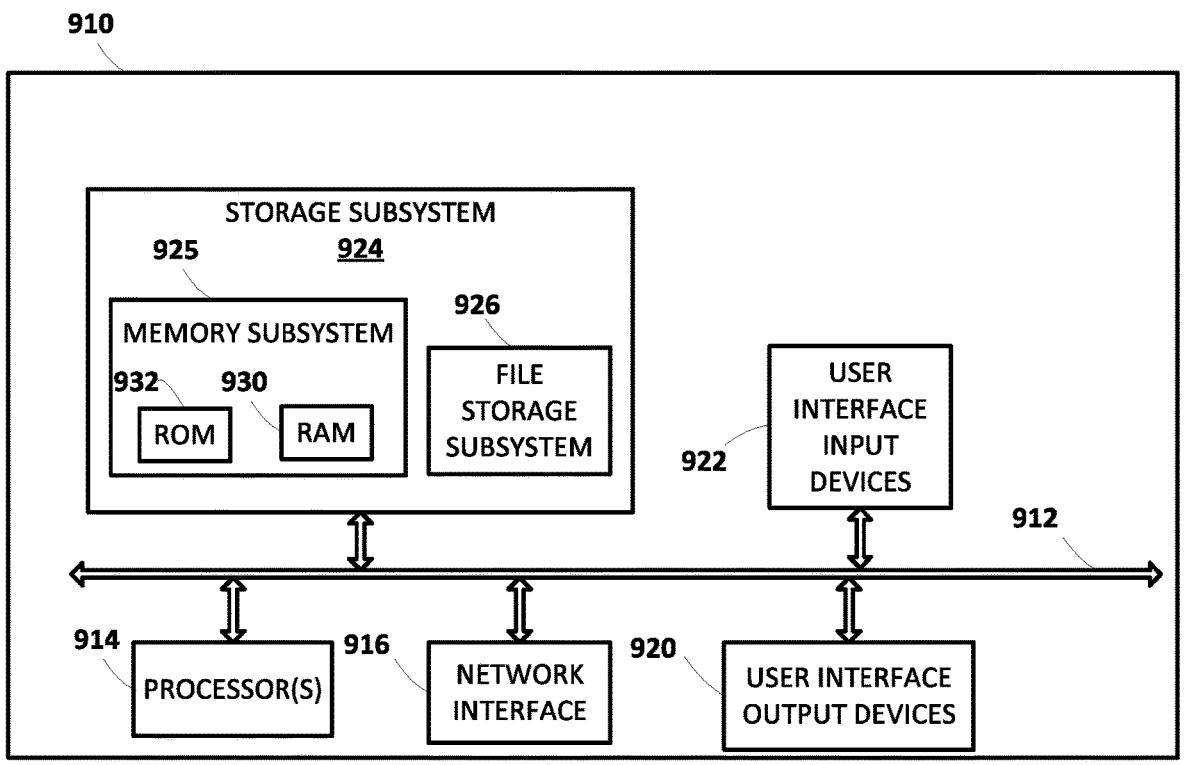
FIG. 9 schematically depicts an example architecture of a computer system.

FIG. 9 is a block diagram of an example computing device 910 that may optionally be utilized to perform one or more aspects of techniques described herein. For example, in some implementations computing device 910 may be utilized to provide desired locomotion by robot 825 and/or other robots. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the process of FIGS. 3, 4, 5, and/or 7.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, comprising:
receiving an instance of sensor data, the instance of sensor data generated based on output from one or more sensors of a robot,
wherein the instance of sensor data is based on a state of the robot following control of the robot using a prior instance of robot control parameters generated by applying a first observation and a first reference trajectory to a neural network model, the neural network model representing a learned policy for a robotic locomotion task and being previously trained through reinforcement learning, wherein the first reference trajectory indicates a first gait for the robotic locomotion task, is decoupled from the sensor data and is influenced by a first user interaction via one or more user interface input devices, and
wherein the learned policy can be varied;
receiving a second reference trajectory indicating a second gait for the robotic locomotion task, wherein the second reference trajectory is decoupled from the sensor data and is influenced by a second user interaction via the one or more user interface input devices, and wherein the second gait is distinct from the first gait;
generating a second observation based on the instance of sensor data, wherein the second observation includes data missing from the second reference trajectory;
applying the second observation and the second reference trajectory to the neural network model to generate a current instance of robot control parameters; and
controlling one or more actuators of a robot based on the current instance of robot control parameters.

2. The method of claim 1, wherein the robot is a legged robot comprising a plurality of legs, and wherein the current instance of robot control parameters define, for each of the plurality of legs, a desired pose of the leg.

3. The method of claim 1, wherein the observations indicate motor angles, roll of a base of the robot, pitch of a base of the robot, and angular velocity of the robot.

4. The method of claim 3, wherein the observations indicate only the motor angles, the roll, the pitch, and the angular velocity of the robot.

5. The method of claim 3, wherein the observations exclude one or more available observations that are indicated by the instance of sensor data.

6. The method of claim 5, wherein the excluded one or more available observations include a yaw of the base of the robot.

7. The method of claim 1, further comprising:
training the neural network model in a simulator using a simulated robot and using reinforcement learning.

8. The method of claim 7, wherein training the neural network model in simulation comprises modeling, for the simulated robot, a simulated latency between: the time when the output from one or more sensors of the robot is captured, and the time when one or more actuators of the robot are controlled based on the current instance of robot control parameters.

9. The method of claim 7, wherein training the neural network model in simulation using reinforcement learning comprises:
utilizing a reward function, during the reinforcement learning, wherein the utilized reward function penalizes a high robot energy consumption.

10. The method of claim 9, wherein the utilized reward function further encourages a faster forward robot speed.

11. The method of claim 1, wherein the first reference trajectory and/or the second reference trajectory comprises a symmetric sine function.

12. The method of claim 1, wherein the one or more sensors are one or more motor encoders and one or more inertial measurement units.

13. A method implemented by one or more processors, comprising:
  receiving an instance of sensor data, the instance of sensor data generated based on output from one or more sensors of a sensor component of a robot,
    wherein the instance of sensor data is based on a state of the robot following control of the robot using a prior instance of robot control output parameters,
    wherein the prior instance of robot control output parameters are generated based on a prior instance of pattern generator phase data and a prior instance of feedback output,
    wherein the prior instance of pattern generator phase data is based on processing a prior instance of robot controlled parameters using a pattern generator component of a neural network model,
    wherein the prior instance of robot controlled parameters indicates a prior gait for a locomotion task for the robot and are provided by a user at one or more user interface input devices after the neural network model is trained,
    wherein the prior instance of feedback output is generated based on processing the prior instance of pattern generator phase data, the prior instance of robot controlled parameters, and a prior instance of sensor data using a feedback component of the neural network,
    wherein the neural network model is decoupled into the pattern generator component and the feedback component, and
    wherein the neural network model is a learned policy for the locomotion task for the robot;
  receiving an instance of robot controlled parameters provided by the user indicating a given gait at the one or more user interface input devices, wherein the prior gait is distinct from the given gait;
  generating an instance of pattern generator phase data based on processing the instance of robot controlled parameters using the pattern generator component of the neural network;
  generating an instance of feedback output based on processing the instance of robot controlled parameters, the instance of sensor data, and the instance of pattern generator phase data using the feedback component of the neural network;
  generating an instance of robot control output parameters based on processing the instance of pattern generator phase data and the instance of feedback output; and
  controlling one or more actuators of the robot based on the instance of robot control output parameters.

14. The method of claim 13, wherein the robot is a quadruped robot.

15. The method of claim 14, wherein generating the prior instance of pattern generator phase data and/or the instance of pattern generator phase data comprises generating an asymmetric sine curve.

16. The method of claim 14, wherein the asymmetric sine curve comprises a swing phase and a stance phase, wherein the swing phase indicates one or more legs of the quadruped robot are off the ground and the stance phase indicates one or more legs of the quadruped robot are on the ground.

17. The method of claim 16, wherein the prior instance of robot controlled parameters and/or the instance of robot controlled parameters change the asymmetric sine curve.

18. The method of claim 13, wherein the one or more sensors are one or more motor encoders and one or more inertial measurement units.

* * * * *